United States Patent [19]
Davies

[11] 3,826,937
[45] July 30, 1974

[54] EDDY CURRENT COUPLINGS

[76] Inventor: Evan John Davies, 2 Knighton Rd., Sutton Coldfield, England

[22] Filed: Aug. 14, 1972

[21] Appl. No.: 280,126

[52] U.S. Cl. .............................................. 310/105
[51] Int. Cl. .......................................... H02k 49/04
[58] Field of Search...................... 310/93, 218, 105

[56] References Cited
UNITED STATES PATENTS

| | | | |
|---|---|---|---|
| 2,606,948 | 8/1952 | Jaeschke | 310/105 |
| 2,701,315 | 2/1955 | Winther | 310/105 |
| 2,971,105 | 2/1961 | Jaeschke | 310/105 |
| 3,113,229 | 12/1963 | Jacobs | 310/105 |
| 3,365,598 | 1/1968 | Jaeschke | 310/105 |

*Primary Examiner*—D. F. Duggan
*Attorney, Agent, or Firm*—Spencer & Kaye

[57] ABSTRACT

An eddy current coupling comprising coaxial input and output shafts, a pole member connected to one of the shafts and having a series of poles provided with one or more field windings, alternate poles exhibiting the same polarity on excitation of the field winding or windings, and a loss member which comprises a support connected to the other shaft, a loss ring of ferromagnetic material carried by the support so that there is only a small air gap between the poles of the pole member and the loss ring and end rings of non-magnetic material of lower electrical resistivity than that of the material of the loss ring, the end rings being located at the edges of the loss ring in good electrical contact therewith, whereby the loss member provides a path for magnetic flux between the poles of the pole member and also a conductor for the resulting induced voltages which cause eddy currents in the loss member, the reaction between the eddy currents and the flux serving to transmit torque between the members while there is slip between them.

11 Claims, 2 Drawing Figures

3,826,937

EDDY CURRENT COUPLINGS

BACKGROUND OF THE INVENTION

FIELD OF THE INVENTION

This invention relates to eddy current couplings of the kind comprising an input shaft, an output shaft, one of one or more field windings, a pole member which exhibits a series of poles, alternate poles of the series exhibiting the same polarity when the field winding or windings is or are excited, the pole member being connected to one of the shafts, and a loss member connected to the other shaft and associated with the pole member so as to provide a path for magnetic flux between the poles and also a conductor for the resulting induced voltages which cause eddy currents in the loss member. The reaction between the eddy currents and the flux serves to transmit torque between the members, which are rotatable about a common axis, while there is slip, i.e., relative rotation between the members. Such a coupling is hereinafter referred to as being of the kind specified.

Normally the loss member provides the input and is connected to a constant speed source, e.g. a squirrel-cage electric motor. For a constant torque, the speed of the pole member is dependent upon the excitation of the field coil or coils.

The object of the invention is to provide an eddy current coupling which is efficient and which is structurally strong and economical.

SUMMARY OF THE INVENTION

According to the invention, a coupling of the kind specified is provided wherein the loss member comprises a support secured to one of the shafts, a loss ring of ferro-magnetic material (as herein defined) carried by the support so that there is only a small air gap between the poles and the ring and end rings of non-magnetic material of lower electrical resistivity than that of the material of the loss ring and located at the edges of the loss ring and in good electrical connection therewith.

The term "ferro-magnetic material" is understood to means iron, iron alloys containing at least 95 percent by weight of iron, nickel and nickel alloys containing at least 95 percent by weight of nickel.

A coupling of this construction may be economically constructed because the support can be of a material which is structurally strong while the loss ring can be of ferro-magnetic material which will provide the flux path and electrical conductor. Moreover, the end rings reduce so far as possible the resistance of the closed paths followed by the eddy currents and thus cut down the heat generated in the coupling and also in increases the efficiency of the coupling.

Preferably, the support itself is of ferrous material of greater resistivity than the loss ring. Thus the support could be made of mild steel or spheroidal graphite cast iron. The loss ring may be made of ingot iron or nickel or superposed layers of iron and nickel or of other low resistivity ferro-magnetic material, the end rings preferably being made of high conductivity copper. However, the support could be made of aluminium or an aluminium alloy but this would not perform as well at low slip rates as a coupling having a support of ferrous material.

Preferably the pole member carries one or more field windings. If desired, however, a stationary field can be provided and there will then be parasitic air gaps between the field and the pole member. This construction is not preferred, however, because it is not as efficient as a coupling having a rotating field winding.

Preferably the pole member has salient poles, each pole of at least half of the poles carrying a field winding. Normally each pole will carry a field winding so that upon excitation of the windings, alternate poles will be of the same polarity; but it is also possible either to arrange a winding around only alternate poles which will have the same effect or to use a serpentine winding, i.e., a winding that zig-zags around adjacent poles of the series.

If desired, the pole member may have Lundell, or interdigitated poles in which case there would be a single annular winding for the poles.

In any of the foregoing arrangements the pole member is preferably made of a plurality of laminations of ferrous material held in close proximity and arranged to cut down the eddy current losses in the pole member.

In a preferred construction the loss ring of, for example, ingot iron is placed in position by electro-deposition, thus the end rings may be secured to the support and then the ingot iron is electrically deposited so that an intermolecular bond is obtained between the copper end rings and the ingot iron so that there is a good electrical connection between the two. There is also a bond between the support if this is, for example, of mild steel and the ingot iron forming the loss ring. To facilitate deposition, a layer of nickel can first be deposited on the support and then a layer of ingot iron deposited on the nickel. If desired the loss ring can be formed entirely of nickel electro-deposited in position. Alternatively, the loss ring can be secured in position by a fusion process such as brazing.

The loss member may be in the form of a drum which surrounds the pole member or which is surrounded by the pole member.

BRIEF DESCRIPTION OF THE DRAWINGS.

The invention will now be described in detail by way of example with reference to the accompanying drawings in which.

DESCRIPTION OF THE PREFERRED EMBODIMENT.

Figure 1:
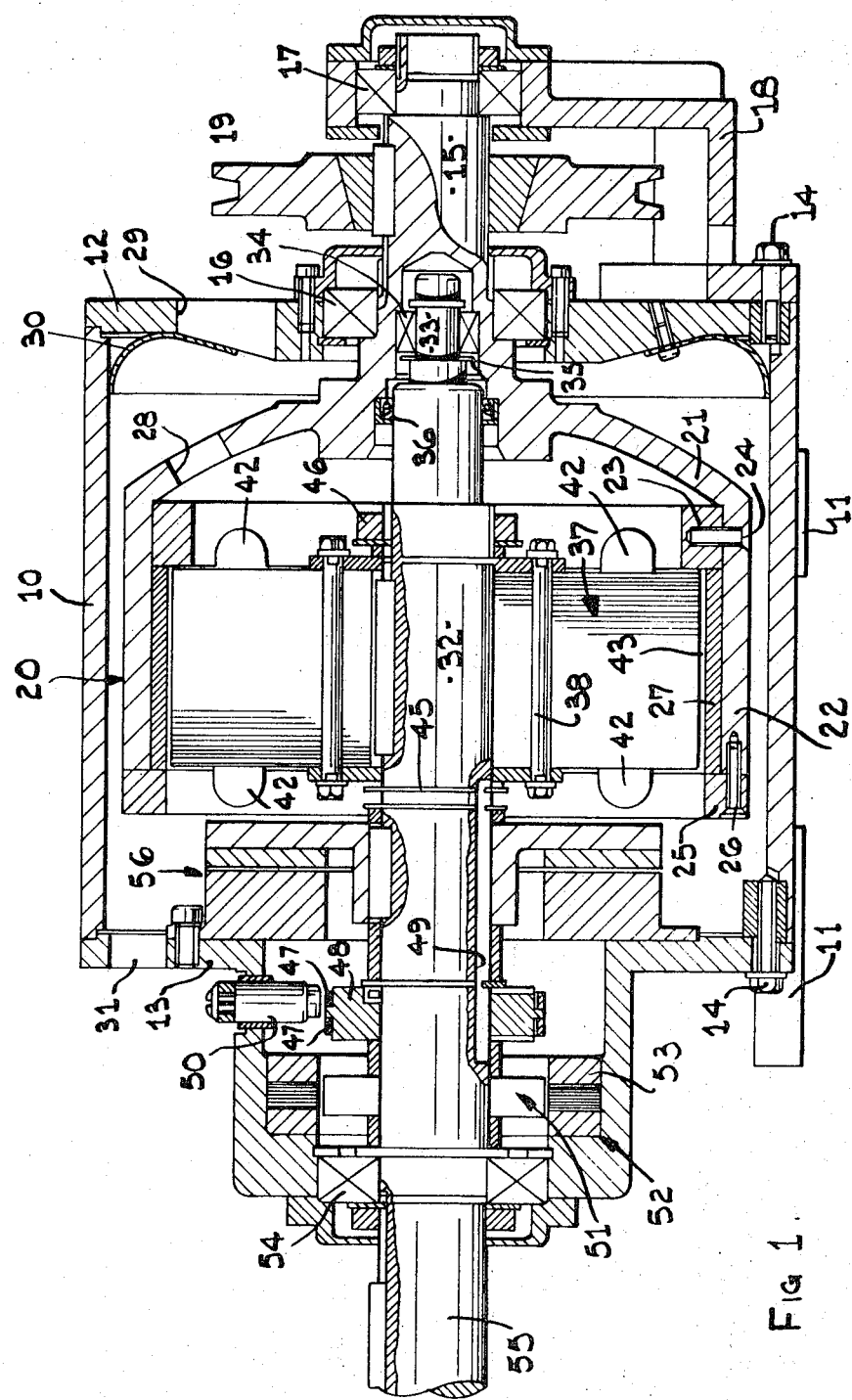
FIG. 1 is a longitudinal section through an eddy current coupling constituting an embodiment of the invention.

Referring first to FIG. 1, the coupling shown includes a cylindrical casing 10 having supporting flanges 11 and being closed at its ends by disc-like end members 12 and 13 secured to the casing 10 by bolts 14. An input shaft is indicated at 15 and is supported in a bearing 16 in the end member 12 and a second bearing 17 in an out-rigger structure 18. Mounted on the shaft between the end member 12 and the structure 18 is a pulley 19 which is keyed to the shaft. The pulley is arranged to receive a driving belt which is driven, for example, by a constant speed electric motor.

The input shaft extends to within the casing and is integrally formed with a loss member indicated generally at 20 which is in the form of a drum. The drum comprises a flange 21 and a cylindrical portion 22.

A first copper end ring 23 is secured internally of the cylindrical portion 22 by means of screws 24, the end ring 23 being adjacent to the flange 21. A second copper end ring 25 is secured to the free end of the cylindrical portion 22 by means of screws 26. Between the end rings 23 and 25 and on the internal surface of the cylindrical portion 22 is a loss ring 27. The drum 20 and the input shaft 15 are conveniently formed from mild steel while the end rings 23 and 25 are formed from high conductivity copper. The loss ring 22 is preferably of pure or ingot iron which has a low resistivity of the order of $9.71\text{-}11 \times 10^{-8}$ ohm-metre. The loss ring is in good electrical contact with the end rings 23 and 25.

One method of securing the loss ring 27 in position is to deposit it on the cylindrical portion 22 by electro-deposition techniques. The loss ring will be deposited after the end rings 23 and 25 have been secured to the cylindrical portion 22. There will thus be an intermolecular bond between the iron of the loss ring and the copper of the end rings so there will be very good electrical contacts between the various rings. Moreover, there will be an intermolecular bond between the iron and the mild steel of the cylindrical portion 22 so that this will hold the loss ring 27 in position. Due to the bonding between the rings and between the ring 27 and the cylindrical portion 22 the end rings will be held in position and the screws securing them to the cylindrical portion 22 may merely be used as temporary supports. If desired a layer of nickel can first be deposited on the support followed by a layer of ingot iron.

Alternatively, the loss ring 27 may be brazed in position between the end rings 23 and 25. Moreover, although it is preferred to use a support member 21 of ferrous material such as mild steel which has a higher electrical resistivity than that of pure iron it is within the scope of the invention to use a support member of other material such as an aluminium alloy having a ferro-magnetic loss ring such as 27 secured thereto.

The flange 21 of the loss member is provided with a plurality of holes, one of which is indicated at 28 and the flange is also furnished with a fan, not shown in the drawings, so that upon rotation of the loss member by the input shaft 15 cooling air is drawn through holes 29 in the end member 12, guided by a sheet metal guide 30 and passes over the loss member and also through the holes 28 and over the pole member to be described and leaves the coupling through holes 31 in the end member 13.

The coupling has an output shaft 32 which at its right hand end has a reduced portion 33 received in a bearing 34 in a counter bore 35 in the input shaft 15. An oil seal 36 is interposed between the output shaft 32 and the flange 21 thus to retain lubricant in the bearing 34.

The output shaft 32 carries a pole member indicated generally at 37 which is keyed to the shaft 32 and which comprises a plurality of laminations of ferrous material secured together by through bolts 38.

Figure 2:
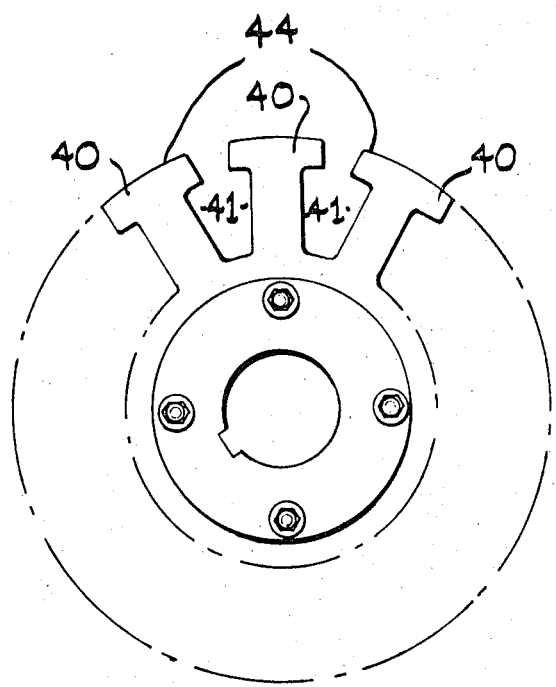
FIG. 2 is a partial end view of the pole member of the coupling of FIG. 1 showing the pole shape thereof.

FIG. 2 is a partial end view of the pole member and it will be seen that there are salient poles some of which are indicated at 40 with solts 41 between the poles. Each pole 40 is surrounded by a field winding, the windings not being shown in FIG. 2 but being indicated at 42 in FIG. 1. There is a small air gap 43 between the outer surfaces 44 of the poles 40 and the inner surface of the iron loss ring 27. The pole member is secured on the shaft 32 between a circlip 45 and a nut 46.

The field windings 42 are supplied with electrical current through slip rings and brushes. Thus there are two slip rings 47 carried by an insulating boss 48 on the shaft 32 and the latter has a slot 49 through which pass leads, not shown, from the slip rings to the winding. Each slip ring is associated with a brush, one of which is shown at 50, the brushes being mounted on the end member 13.

Between the brush gear and the pole member there is mounted on the shaft 32 an electro-magnetic friction brake indicated generally at 56 and which may be of any desired conventional construction.

The shaft 32 also carries a rotor 51 for a tacho-generator indicated generally at 52 and of which the stator is indicated at 53.

The shaft 32 has an outboard bearing 54 and the portion 55 extending from the coupling is arranged to carry a drive pulley or similar member.

In operation, the pulley 19 is rotated by, for example, an electric motor at constant speed and this rotates the input shaft 15 and the loss member 20. The field windings 42 are excited via the brushes 50 and slip rings 47. Due to the relative rotation between the loss member and the pole member eddy currents are caused to flow round closed paths in the loss member thus reacting with the magnetic flux of the pole member to cause the latter to rotate and thus drive the output shaft 55. As is well known, the speed of the output shaft can be regulated by the excitation of the field coils 42.

The loss ring 27 provides a path for the flux between the opposing poles of the pole member. The loss ring also provides a conductor for the eddy currents which flow in closed loops with the ends of the loops being in the high conductivity end rings 23 and 25. The resistance of the closed loops is thus kept to a minimum and thus the heat generated and the power loss is kept to a minimum.

Moreover, since the support may be formed of mild steel, spheroidal graphite cast iron or similar material it can be easily formed and is structurally strong. Moreover it is comparatively cheap. In one construction the support may be of said cast iron and the loss ring of low resistivity mild steel having a resistivity for example $12\text{-}16 \times 10^{-8}$ ohm-metre. Loss rings of nickel and nickel alloys containing at least 95% by weight of nickel may also be used. It will be seen therefore that the invention provides a structurally desirable eddy current coupling with high efficiency and which is easy to manufacture.

The invention has been described in relation to a pole member having salient poles each of which carries a field winding. However, if desired, only each alternate pole may carry a field winding or there may be a single serpentine winding as described above. In another but less preferred form of the invention, the pole member may be arranged to have Lundell or interdigitated poles with but a single field winding coil.

The invention is also applicable to an eddy current coupling having a stationary field coil around which the pole member rotates but this is not a preferred construction.

I claim:

1. An eddy current coupling comprising a rotatable input shaft, a rotatable output shaft, at least one field winding, a pole member on which the field winding is mounted and which exhibits a series of poles, alternate poles of the series exhibiting the same polarity when the field winding is excited, the pole member being connected to one of the shafts for rotation therewith, and a loss member connected to the other shaft for rotation therewith and being coaxial with the pole member, said loss member being associated with the pole member so as to provide a path for magnetic flux between the poles and also a conductor for the resulting induced voltages which cause eddy currents in the loss member whereby the reaction between the eddy currents and the flux serves to transmit torque between the member while there is slip, i.e. relative rotation, between the members; said loss member including: a support of a ferrous material having a first electrical resistivity, said support being secured to said other shaft; a loss ring of ferromagnetic material having a second electrical resistivity lower than said first electrical resistivity, said ferromagnetic material containing at least 95 percent by weight of a metal selected from the group consisting of iron and nickel, said loss ring being a relatively thick continuous member which is carried by a coextensive portion of said support so that there is a small air gap between the poles of the pole member and the loss ring; and end rings of nonmagnetic material having a third electrical resistivity lower than said second electrical resistivity and located at the edges of the loss ring in good electrical contact therewith.

2. A coupling according to claim 1 wherein the support is made of mild steel, the loss ring comprises ingot iron and the end rings are made of high conductivity copper.

3. A coupling according to claim 1 wherein the support is made of spheroidal graphite cast iron, the loss ring comprises low resistivity mild steel and the end rings are made of high conductivity copper.

4. A coupling according to claim 1 wherein the loss ring includes a layer containing at least 95 percent by weight iron adjacent to said poles and an underlying layer containing at least 95 percent by weight of nickel.

5. A coupling according to claim 1 wherein the pole member carries a plurality of field windings.

6. A coupling according to claim 5 wherein the pole member has salient poles at least half of which carry field windings.

7. A coupling according to claim 1 wherein the pole member is made of a plurality of laminations of ferrous material.

8. A coupling according to claim 1 wherein the loss ring consists of electrolytically pure metal.

9. A coupling according to claim 1 wherein the pole member is substantially cylindrical and the loss member is in the form of a drum which surrounds the pole member such that the loss ring surrounds the poles.

10. A coupling according to claim 1 wherein the metal of the loss ring forms an intramolecular bond with the end rings.

11. A coupling according to claim 1 wherein the loss ring comprises an electrolytically pure layer of nickel on the surface of said support and a layer of electrolytically pure iron on the surface of said layer of nickel.

* * * * *

UNITED STATES PATENT OFFICE
CERTIFICATE OF CORRECTION

Patent No. 3,826,937  Dated  July 30th, 1974

Inventor(s) Evan John Davies

It is certified that error appears in the above-identified patent and that said Letters Patent are hereby corrected as shown below:

In the heading of the patent, after line 5, insert
--Foreign Application Priority Data
Aug. 12, 1971   Great Britain ...........37915/71--;

Column 1, line 6, delete "one", line 7, delete "of", line 43, change "means" to --mean--, line 53, change "in increases" to --increases--;

Column 3, line 63, change "solts" to --slots--.

Signed and sealed this 3rd day of December 1974.

(SEAL)
Attest:

McCOY M. GIBSON JR.
Attesting Officer

C. MARSHALL DANN
Commissioner of Patents